United States Patent [19]

Friedman

[11] 3,874,453
[45] Apr. 1, 1975

[54] RECOVERY OF VISCOUS ACIDIC CRUDE OILS

[75] Inventor: Robert H. Friedman, Houston, Tex.

[73] Assignee: Getty Oil Company, Los Angeles, Calif.

[22] Filed: Dec. 6, 1972

[21] Appl. No.: 312,674

[52] U.S. Cl. .................................. 166/270, 166/274
[51] Int. Cl. ....................... E21b 43/22, E21b 43/27
[58] Field of Search ............ 166/270, 273, 274, 300

[56] References Cited
UNITED STATES PATENTS

| | | | |
|---|---|---|---|
| 2,827,964 | 3/1958 | Sandiford et al. | 166/274 |
| 3,111,984 | 11/1963 | Reisberg | 166/270 |
| 3,174,542 | 11/1963 | Reisberg | 166/270 |
| 3,185,214 | 5/1965 | Bernard et al. | 166/270 |
| 3,298,436 | 1/1967 | McCardell | 166/270 |
| 3,344,858 | 10/1967 | Gilchrist et al. | 166/270 |
| 3,358,757 | 12/1967 | Holmes | 166/270 |
| 3,387,655 | 6/1968 | Hurd | 166/273 |
| 3,464,492 | 9/1969 | Friedman | 166/270 |
| 3,700,031 | 10/1972 | Germer et al. | 166/270 |

OTHER PUBLICATIONS

Condensed Chemical Dictionary, 1964, p 39.

*Primary Examiner*—Ernest R. Purser
*Assistant Examiner*—Jack E. Ebel
*Attorney, Agent, or Firm*—Arnold, White & Durkee

[57] ABSTRACT

Methods are provided for cold recovery of highly acidic petroleum crude oils, i.e., those crudes having an acid number of at least about 2.5. The methods include injecting into the crude oil aqueous solution of barium hydroxide, whereupon the barium hydroxide reacts with the acid in the crude to form an oil-soluble barium soap. The barium soap emulsifies in the oil to form a grease-like barrier layer, and the crude is then pushed by a suitable pushing agent such as viscous water from behind the grease barrier, to a producing well from where the crude is produced.

10 Claims, No Drawings ns in excess of 2.5 and viscosities of about 1,000
RECOVERY OF VISCOUS ACIDIC CRUDE OILS

BACKGROUND OF THE INVENTION

This invention relates to recovery of crude oils, and especially to recovery of those crudes which are highly acidic. The invention is especially directed to such crudes which are high in viscosity, often called "heavy" crudes, but in some contexts of use the invention might also be used in connection with less viscous crudes.

Various methods for producing certain heavy crude oils such as those from the Kern County area of California have been suggested and/or attempted. The high viscosity of such crudes prevents their economical production with conventional techniques such as simple water flooding. Many such crudes are presently being economically produced only by certain thermal recovery processes such as steam displacement. In these processes, part of the oil recovered from the ground is used as the fuel to generate steam, etc. For example, see my U.S. Pat. No. 3,380,521 issued Apr. 30, 1968. While such processes have proven to be the most efficient now available in many situations, and indeed perhaps the only presently known methods which are effective for economical recovery of certain very viscous crudes, the disadvantages of such methods are readily apparent.

Such methods require, first of all, that a part of the oil produced be burned for fuel. This of course is economically disadvantageous since the oil is produced by an expensive process and could be more efficiently utilized. It is also inconsistent with sound conservation since established energy sources such as oil are being rapidly depleted.

Secondly, a rather severe pollution problem is encountered upon combustion of much of this heavy oil, which is highly acidic. Sulphur dioxide and certain oxides of nitrogen are some of the undesirable combustion products. In more and more instances, a serious if not critical pollution problem is presented. Indeed, certain operations are even in danger of being unwillingly terminated because of the pollution problems.

It is estimated that in some operations in such areas, more than 10,000 barrels of oil per day are burned, resulting in the formation of more than 35 tons of sulphur dioxide alone. At the present time, there is no economically and otherwise satisfactory method for reducing these undesirable effluents to levels which comply with present and expected future state and local pollution standards. But even if the pollution problems could be alleviated by reduction of the undesired combustion products, burning of the recovered oil would still be uneconomical and contrary to sound conservation practices.

It would thus be advantageous if a method for recovery of such heavy acidic crude oils could be provided without the necessity for burning oil to produce oil.

It would further be advantageous if a simple and economical method could be devised for producing viscous acidic crude oils, which would be sound from a conservation standpoint and not entail air pollution problems.

This invention provides such methods.

SUMMARY OF THE INVENTION

Highly acidic crude oils are recovered by injecting into the crude, in formation, quantities of an aqueous solution of a soap-making agent which forms a soap with the oil, the resulting soap being preferentially soluble in oil. The oil-soluble soap thus formed emulsifies in the acidic crude, forming a grease-like barrier layer. A pushing agent is then injected through an injection well to drive the crude, from behind the grease-like barrier, toward a producing well from where the oil is produced.

Applicant's preferred soap-making agent is barium hydroxide. Aqueous solutions of barium hydroxide in the amount of approximately 0.2 pore volume, or less, may be injected through the injection well, followed by injection as the pushing agent of viscous water in the amount of at least 0.5 pore volume.

DETAILED DESCRIPTION OF PREFERRED EMBODIMENT

In its broadest terms, this invention contemplates the injection into a formation containing an acidic crude oil, of a soap-making agent, which upon reaction with the acid in the oil will form a soap that is preferentially soluble in oil. Following formation of the oil-soluble soap, the soap reacts with the oil to form a grease at the oil-soap interface. The invention then contemplates pushing the oil by suitable means toward one or more producing wells, from which point the oil is produced.

The methods of this invention are useful in both primary and post-primary recovery techniques. Generally when the terms "injection well" and "producing well" are used, reference is made to post-primary techniques such as secondary recovery. Those terms will be used herein, however, to refer not only to such postprimary techniques, but also (and perhaps most importantly) to primary recovery of the oil.

As mentioned above, the invention finds its utility in connection with acidic crudes, it being applicant's belief at the time of this application that best results are obtained if the crude has an acid number of at least about 2.5. Further, the invention finds its primary utility in connection with such crudes which are highly viscous, since lighter crudes can generally be produced economically and efficiently by other methods. In some contexts of use, however, the invention might be employed with slightly less acidic crudes than those mentioned above, or with somewhat less viscous crudes.

A good example of the type of heavy acidic crudes with which the invention finds its primary utility are those from the Kern River, Lost Hills, and McKittrick fields in central California. These crudes have acid numbers in excess of 2.5 and viscosities of about 1,000 cp at 75°F.

In accordance with the invention, one or more producing wells are located in the formation containing the heavy acidic crude. One or more injection wells are also located in such formation, although in some contexts of use it may be possible to utilize the same wells as injection and producing wells. The terms "injection" well and "producing" well will be used herein, however, for ease of explanation.

Into one or more of the injection wells is injected a solution of a suitable soap-making agent operable to react with the formation crude to yield an oil-soluble soap. The agent is desirably one which forms an aqueous solution to provide for ease and economy of injection.

The agent which applicant prefers for this use is a suitable alkali metal hydroxide. Specifically, the agent which represents the best mode of this invention known to applicant at the time of this application, is barium hydroxide, $Ba(OH)_2$. Barium hydroxide is available commercially in various hydrates, and also as anhydrous barium hydroxide. It is soluble in water, so that an aqueous solution of the material may be readily prepared for injection through an injection well into an underground formation. The material will react with the acid in an acidic crude oil to produce a soap which is highly soluble in oil, and preferentially soluble in oil as compared to water. The term "soap" is used herein in its broadest sense, and does not refer of course to ordinary soap which term is usually applied to the sodium salts of various fatty acids.

The barium soap thus formed dissolves in the acidic crude, and this soap then acts with the crude to form a grease-like layer (hereinafter referred to as a "grease" layer) at the soap-crude interface. It is believed that this layer acts as a barrier, and pushing the crude from behind this barrier is effective to move the crude through the formation. Pushing the crude toward a producing well is thus effective to allow recovery of the crude from the producing well.

Various means may be employed for pushing the crude from behind the barrier. Pushing with excess quantities of the barium hydroxide solution used as the soap-making agent would perhaps give best results from the standpoint of total oil recovery, but the expense of barium hydroxide will probably dictate against this pushing agent in most situations.

Thus, a suitable pushing agent, following formation of the grease barrier, is water, providing a water-flood. Water flooding, as is well-known, comprises injecting water under pressure into an injection well, driving the oil toward a producing well. Water-flooding alone is used in many applications for recovery of crude oil, but is not satisfactory in many others such as those wherein the viscosity of the crude is so great that the water forms fingers through the crude and is ineffective as a pushing agent.

This fingering of the much less viscous water through the heavy crude may occur even through the grease barrier provided by this invention. Thus, better results can probably be obtained by using a more viscous water, such as a solution of a thickening agent such as carboxymethylcellulose in water, or a fluid such as those disclosed in my copending application Ser. No. 152,411.

Several experiments have been performed to test the methods outlined above, and these experiments are summarized in the examples which follow, which examples are illustrative only and should not be considered limiting of the scope of the invention.

EXAMPLE I

A prototype reservoir was prepared by filling a section of polyvinylchloride (PVC) tube, one and one-fourth inches in diameter and 18 inches long, with 80–100 mesh acidized Ottawa sand. Two layers of screens, 100 and 200 mesh in size, were placed over one end of the tube (the production end), to allow fluid production through the entire cross-sectional area of the tube. The approximate pore volume of the tube was 165cc.

The tube as thus prepared to simulate a petroleum reservoir was evacuated and saturated with tap water.

Crude oil was then taken from a sample which will be referred to as Sample No. 1. This crude was from the McKittrick Field of central California, the Olig-Potter zone. The acid number of the crude was 4.85 and the viscosity was 1,000 centipoises at 75°F. The tube was flooded with crude extracted from this sample, and the initial oil saturation was measured at 93 percent.

Tap water was then injected into the injection end of the tube (the end opposite the production end), and measurements were taken to indicate oil recovery following the injection of certain amounts of water. The results were as shown in Table I.

Thus, it is seen from Table I that by a simple waterflood of a simulated reservoir with 0.8 pore volume of fresh water, only 20 percent of the initial oil in place could be recovered.

EXAMPLE II

A simulated reservoir was prepared and saturated with water as in Example I. The tube was then flooded with crude oil from Sample No. 1, and the initial oil saturation of the tube was measured at 88 percent.

A saturated aqueous solution of potassium hydroxide was prepared, and 0.2 pore volume potassium hydroxide was injected into the tube through the injection end thereof. This injection was followed by injection of water until the total amount of fluid injected reached 0.84 pore volume. The results of this experiment were as shown in Table I.

Thus, the addition of 0.2 pore volume of an aqueous solution of potassium hydroxide, as the soap-making agent, essentially doubled the recovery of initial oil in place, when compared to Example I, following injection of a like amount of fluid.

EXAMPLE III

A prototype reservoir was prepared as in Example I, and saturated with water. The tube was then flooded with crude oil from Sample 1, and the initial oil saturation of the tube was measured at 94 percent.

A saturated barium hydroxide, $Ba(OH)_2$, solution was prepared by mixing an excess amount of barium hydroxide in deionized water at 75°F. The solution was filtered to remove any undissolved barium hydroxide and stored in an enclosed container to avoid formation of barium carbonate.

Barium hydroxide solution was then injected into the tube in the same manner as described above in connection with Examples I and II, with the results shown in Table I.

EXAMPLE IV

A reservoir for laboratory use was prepared as in Example I, and saturated with water. Crude oil from Sample No. 1 was used to flood the tube, and the initial oil saturation was measured at 94 percent.

0.2 pore volume barium hydroxide solution was injected in the same manner as mentioned in the preceding examples. This injection was followed by the injection of 0.2 pore volume of water and 0.4 pore volume of an aqueous solution of carboxymethylcellulose.

A 2 percent increase in recovery of initial oil in place was noted, when compared to the results of Example III above.

EXAMPLE V

The reservoir was prepared as in Example I, and saturated with water. The tube was then flooded with oil taken from Sample No. 1, and the initial oil saturation was measured at 93 percent.

0.2 pore volume saturated barium hydroxide solution was then injected in the manner described above. This injection was followed in the same manner by the injection of 0.06 pore volume water, and 0.54 pore volume of an aqueous solution of carboxymethylcellulose.

The results were as shown in Table I.

EXAMPLE VI

Example III was repeated, except the initial oil saturation in the tube was reduced from 93 percent to 73 percent. The results were as shown in Table I.

EXAMPLE VII

A tube was prepared and packed as in Example I, and saturated with water.

The tube was then flooded with a crude oil taken from Sample No. 2, and the initial oil saturation measured at 96 percent. The crude of Sample No. 2 was taken from the Kern River Field of central California, and had an acid number of 2.80 and a viscosity of 6,000 centipoises at 75°F.

Fresh water was then injected into the tube in the manner described in Example I, a total of 0.8 pore volume of water being injected. The results are indicated in Table I.

EXAMPLE VIII

A prototype reservoir was prepared as in Example I, and saturated with water. Crude oil from Sample No. 2 was then used to flood the tube, the initial oil saturation being measured at 93 percent.

0.8 pore volume barium hydroxide solution was then injected into the tube in the manner described above, with the results as shown in Table I.

EXAMPLE IX

A reservoir was prepared as described in Example I, and saturated with water.

Crude oil from Sample No. 2 was used to flood the reservoir so that the initial oil saturation measured 77 percent.

As in Example VIII, 0.2 pore volume of a saturated solution of barium hydroxide, as the soap-making agent, was injected, with the results as shown in Table I.

EXAMPLE X

The reservoir was prepared as in Example I, and saturated with water. The tube was then flooded with crude oil from Sample No. 2 and the initial oil saturation measured at 97 percent.

A saturated solution of sodium behenate was then injected in the manner described above, and the results were as shown in Table I.

EXAMPLE XI

Example VIII was repeated, except that instead of injecting 0.8 pore volume barium hydroxide, only 0.2 pore volume barium hydroxide was injected, then followed by 0.6 pore volume water.

The results showed that 36 percent of the initial oil in place was recovered after the injection of fluids totaling 0.8 pore volume.

TABLE I

| Example No. | Oil Recovered, % of initial oil in place after injection of | | |
|---|---|---|---|
| | 0.4 pore volume | 0.6 pore volume | 0.8 Pore volume |
| I | 16% | 18% | 20% |
| II | 27% | 35% | 39% |
| III | 41% | 56% | 58% |
| V | 43% | 64% | 66% |
| VI | 28% | 32% | 40% |
| VII | 17% | 19% | 21% |
| VIII | 42% | 48% | 51% |
| IX | 42% | 54% | 55% |
| X | 23% | 26% | 32% |

In addition to the above tests, additional experiments were performed similar to those reported above as Examples I–VI using yet another crude oil sample. This sample was also taken from the Olig-Potter zone, McKittrick Field of California, but this sample had an acid number of 5.17 and a much greater viscosity at 75°F than that of Sample No. 1, i.e., 17,000 cp. Results were obtained which were quite similar to those illustrated above for Examples I–VI.

As is apparent from the preceding examples, the amount of soap-making agent injected is not of critical importance, although it is believed that probably at least about 0.1 pore volume should be injected for best results, since about this amount is probably necessary for formation of a dependable grease barrier layer. Beyond this amount, further injection of the soap-making agent may become uneconomical, and further injection should probably be of a less expensive fluid such as viscous water.

It is seen in the above example that in the limited experiments performed thus far, it appears that best results are obtained when injection of a relatively small amount (0.2 pore volume in the example) of barium hydroxide solution is followed by a relatively large amount of viscous water (water thickened with carboxymethylcellulose in the example).

Although the examples show improvement over simple water flooding when soap-making agents other than barium hydroxide, such as potassium hydroxide and sodium behenate, are used, it is clear that barium hydroxide is much superior to these other tested soap-making agents. The difficulty with potassium hydroxide is that the soap formed upon reaction with the acid in the oil is preferentially water soluble.

It is also apparent from the examples given above, that relatively large amounts of the original oil in place may be recovered by use of this invention. Thus, in Example V, it was seen that recovery of the original oil in place exceeded 65 percent. This compares most favorably with projected recovery using present thermal techniques which have all the disadvantages mentioned above.

Although the invention has been explained in terms of particular and preferred embodiments, it will be apparent to those of skill in the art that various changes may be made in the methods illustrated without departing from the scope of the invention as covered by the following claims.

I claim:

1. A method for recovery of highly acidic petroleum crude oil having a viscosity of at least on the order of about 1000 cp at 75°F, from an underground formation having therein at least one injection well and at least one producing well, comprising:

injecting through an injection well an aqueous solution of barium hydroxide;

said barium hydroxide reacting with the acidic crude oil to form an oil-soluble soap, and said soap further reacting with said crude to form a grease-like barrier layer;

injecting a pushing agent through said injection well to push said crude, from behind said barrier layer, toward said producing well; and producing said crude oil through said producing well.

2. The method in accordance with claim 1, wherein said pushing agent is a viscous aqueous solution.

3. The method in accordance with claim 2, wherein said pushing agent is an aqueous solution of carboxymethylcellulose.

4. The method in accordance with claim 1, wherein said pushing agent is an aqueous solution of barium hydroxide.

5. A method for recovery of highly acidic petroleum crude oil having a visocisty of at least on the order of 1000 cp at 75°F, from an underground formation having therein at least one injection well and at least one producing well, comprising:

injecting through said injecting well at least about 0.1 pore volume of an aqueous solution of barium hydroxide;

said barium hydroxide reacting with said crude to form an oilsoluble soap, and said soap further reacting with said crude to form a grease-like barrier layer;

injecting at least about 0.5 pore volume of a pushing agent through said injection well to push said crude, from behind said barrier layer, toward said producing well; and producing said crude oil through said producing well.

6. The method in accordance with claim 5, wherein said pushing agent is a viscous aqueous solution.

7. The method in accordance with claim 6, wherein said pushing agent is an aqueous solution of carboxymethylcellulose.

8. The method in accordance with claim 5, wherein said pushing agent is an aqueous solution of barium hydroxide.

9. The method in accordance with claim 5, wherein the acid number of said petroleum crude oil is at least about 2.5.

10. The method in accordance with claim 5, wherein about 0.1–0.2 pore volume of said barium hydroxide solution is followed by injection of about 0.5–0.8 pore volume of said pushing agent.

\* \* \* \* \*